US006983720B2

(12) United States Patent
Lakela

(10) Patent No.: US 6,983,720 B2
(45) Date of Patent: Jan. 10, 2006

(54) PAW CLEANING LOUVERED RAMP FOR CAT LITTER BOX

(76) Inventor: Jeffery Willard Lakela, 5629 Palo Rd. 41, Aurora, MN (US) 55705

( * ) Notice: Subject to any disclaimer, the term of this patent is extended or adjusted under 35 U.S.C. 154(b) by 18 days.

(21) Appl. No.: 10/605,588

(22) Filed: Oct. 10, 2003

(65) Prior Publication Data

US 2005/0076844 A1    Apr. 14, 2005

(51) Int. Cl.
*A01K 29/00* (2006.01)
(52) U.S. Cl. .................... 119/165; 119/843; 119/847; 119/161; 14/69.5; 14/71.1
(58) Field of Classification Search ............... 119/165, 119/161, 162, 168, 843, 847, 621, 622, 170, 119/166, 167, 169; 14/69.5, 71.1; D30/112, D30/119, 108
See application file for complete search history.

(56) References Cited

U.S. PATENT DOCUMENTS

| | | | | |
|---|---|---|---|---|
| 554,129 A * | 2/1896 | Lennon | ....................... | 119/526 |
| 788,424 A * | 4/1905 | Ochs | ........................... | 119/849 |
| 1,360,082 A * | 11/1920 | Bort | ........................... | 119/847 |
| 3,246,630 A | 4/1966 | Dearing et al. | ................ | 119/1 |
| 3,618,568 A * | 11/1971 | Breeden | ....................... | 119/482 |
| 3,885,523 A | 5/1975 | Coleman | ....................... | 119/1 |
| 4,088,265 A * | 5/1978 | Garczynski | .................. | 235/454 |
| 4,838,202 A | 6/1989 | Neu | ................................ | 119/1 |
| 5,042,430 A | 8/1991 | Casmira | ....................... | 119/165 |
| 5,092,277 A | 3/1992 | Baillie et al. | ................ | 119/165 |
| D331,990 S | 12/1992 | Burson | ....................... | D30/158 |
| 5,195,464 A | 3/1993 | Mutter | ....................... | 119/165 |
| 5,218,930 A | 6/1993 | Casmira | ....................... | 119/165 |
| 5,220,886 A | 6/1993 | Hyde | ........................... | 119/165 |
| D346,677 S | 5/1994 | Casmira | ....................... | D30/161 |
| 5,329,878 A * | 7/1994 | McCauley | .................. | 119/165 |
| 5,329,879 A * | 7/1994 | Walton | ....................... | 119/166 |
| D351,693 S | 10/1994 | Sutton | ....................... | D30/161 |
| D351,694 S | 10/1994 | Evans | ....................... | D30/161 |
| 5,361,725 A | 11/1994 | Baillie et al. | ................ | 119/165 |
| 5,388,550 A | 2/1995 | Noble | ........................... | 119/165 |
| 5,676,090 A | 10/1997 | Cannady, Jr. | ................ | 119/165 |
| 5,713,302 A | 2/1998 | Walter | ....................... | 119/165 |
| 5,769,026 A | 6/1998 | Kohn | ........................... | 119/165 |
| 5,797,352 A * | 8/1998 | Ebert | ........................... | 119/652 |
| 5,806,461 A | 9/1998 | Kiera | ........................... | 119/165 |
| 5,887,546 A | 3/1999 | Gruel | ........................... | 119/165 |
| 5,924,383 A | 7/1999 | Smith | ........................... | 119/165 |
| 5,992,350 A | 11/1999 | Manzo | ....................... | 119/165 |
| 6,050,223 A | 4/2000 | Harris | ....................... | 119/165 |
| 6,109,211 A | 8/2000 | Tomlinson | .................. | 119/165 |
| 6,109,212 A | 8/2000 | Schacherbauer | ............ | 119/165 |
| D435,149 S | 12/2000 | Kleinberg | .................. | D30/161 |
| 6,357,388 B1 | 3/2002 | Holtrop et al. | ............ | 119/28.5 |
| 6,367,420 B1 | 4/2002 | Tomlinson | .................. | 119/165 |
| 6,386,143 B1 | 5/2002 | Link et al. | .................. | 119/165 |
| 2003/0217700 A1 * | 11/2003 | Northrop et al. | ........... | 119/166 |

FOREIGN PATENT DOCUMENTS

FR        2700920 A1 *   8/1994

* cited by examiner

*Primary Examiner*—Peter M. Poon
*Assistant Examiner*—Andrea M. Valenti

(57) ABSTRACT

A louvered ramp, that serves as a cat's paw-cleaning entry and exit ramp, ascending to, and descending from, a cat litter box.

5 Claims, 2 Drawing Sheets

US 6,983,720 B2

PAW CLEANING LOUVERED RAMP FOR CAT LITTER BOX

DESCRIPTION

Background of Invention

This invention relates to the use of litter boxes by domestic cats. The problem that this invention alleviates, is the problem of cats tracking litter into areas outside of the litter box.

Resolving the problem of cats tracking litter into areas outside of the litter box has been approached in numerous ways. One approach to resolving the problem has been to invent a better litter box; U.S. Pat. Nos. 3,246,630 to Dearing and Dearing (1966), 3,885,523 to Coleman (1975), 4,838,202 to Neu (1989), 5,195,464 to Mutter (1993), 5,329,878 to McCauley (1994), 5,676,090 to Cannady (1997), 5,713,302 to Walter (1998), and 5,806,461 to Kiera (1998), all attempt to resolve the problem by inventing a better litter box. Another approach to resolving the problem has been to invent a litter box containment system; U.S. Pat. Nos. 5,092,277 to Baillie and Baillie (1992), 5,361,725 to Baillie and Baillie (1994), 5,769,026 to Kohn (1998), and 5,887,546 to Gruel (1999), all attempt to resolve the problem by inventing a litter box containment system. Another approach to resolving the problem has been to invent a grate that is connected to, or positioned over a collection tray; U.S. patents Des. 331,990 to Burson (1992), Des. 346,677 to Casmira (1994), Des. 351,694 to Evans (1994), Des. 435,149 to Kleinberg (2000), 5,042,430 to Casmira (1991), 5,218,930 to Casmira (1993), 5,220,886 to Hyde (1993), 5,388,550 to Noble (1995), and 6,109,212 to Schacherbauer (2000), all attempt to resolve the problem by inventing a grate that is connected to, or positioned over a collection tray. Another approach to resolving the problem has been to simply invent a tray to catch and contain litter; U.S. patents Des. 351,693 to Sutton (1994), and 5,992,350 to Manzo (1999), both attempt to resolve the problem by inventing a tray to catch and contain litter. Another approach to resolving the problem has been to invent a paw cleaning litter mat; U.S. Pat. Nos. 5,797,352 to Ebert (1998), 6,050,223 to Harris (2000), 6,357,388 B1 to Holtrop and Widder (2002), and 6,386,143 B1 to Link and Link (2002), all attempt to resolve the problem by inventing a paw cleaning litter mat. Another approach to resolving the problem has been to invent a tray with high side walls, to corral the cat, and catch and contain litter; U.S. Pat. Nos. 6,109,211 to Tomlinson (2000), and 6,367,420 B1 to Tomlinson (2002), both attempt to resolve the problem by inventing a tray with high side walls, to corral the cat, and catch and contain litter. Another approach to resolving the problem has been to invent an enclosed ramp that cats have to jump up to the top of, just to gain access to the ramp, before walking down the ramp to the litter box; U.S. Pat. No. 5,924,383 to Smith (1999), attempts to resolve the problem in such a manner.

None of the prior U.S. patents attempts to resolve the problem of cats tracking litter into areas outside of the litter box, by facilitating a louvered ramp that leads to the litter box. Utilizing a louvered ramp in this manner, effectively removes litter from a cat's paws, allowing the dislodged litter to fall through the cracks between the louver boards (slats), into a collection tray. Such a paw cleaning louvered ramp is the essence of this subject invention. The collection tray for use with this invention could be a nearly flat tray, like the tray that is described by U.S. Patent Number 5,992,350 to Fredda Manzo (1999), except that a textured or ridged top surface on the tray is unnecessary and undesirable for use with this subject invention, since such a tray would be needlessly more difficult to clean. An alternative to using a nearly flat tray for collecting the litter, would be to use a tray with high side walls, like the invention described by U.S. Pat. No. 6,367,420 B1 to Lyla Tomlinson (2002). A tray with high side walls could be useful in encouraging a cat to use this paw cleaning louvered ramp invention.

SUMMARY OF INVENTION

This invention relates to the use of litter boxes by domestic cats. This invention facilitates the removal of litter from a cat's paws, so that the removed litter can be collected in a tray situated underneath this invention. The general idea of this invention is to facilitate a louvered ramp, that serves as a cat's paw-cleaning entry and exit ramp, ascending to, and descending from, a cat litter box. The louvered component of this invention, closely resembles a cut-out from the louvered section of a louvered door. Each of the louver boards (slats) acts as a step in the louvered ramp, allowing a cat to ascend and descend the louvered ramp as though it were a stairway. The ridges of the louver boards (slats) help to facilitate the removal of litter from the cat's paws as it descends the louvered ramp. The cracks between adjacent louver boards (slats) allow litter to fall into a tray positioned beneath the louvered ramp.

BRIEF DESCRIPTION OF DRAWINGS

This invention is illustrated in the drawings where.

DETAILED DESCRIPTION

This invention relates to the use of litter boxes by domestic cats. This invention facilitates the removal of litter from a cat's paws, so that the removed litter can be collected in a tray situated underneath this invention. The general idea of this invention is to facilitate a louvered ramp, that serves as a cat's paw-cleaning entry and exit ramp, ascending to, and descending from, a cat litter box.

Figure 3:
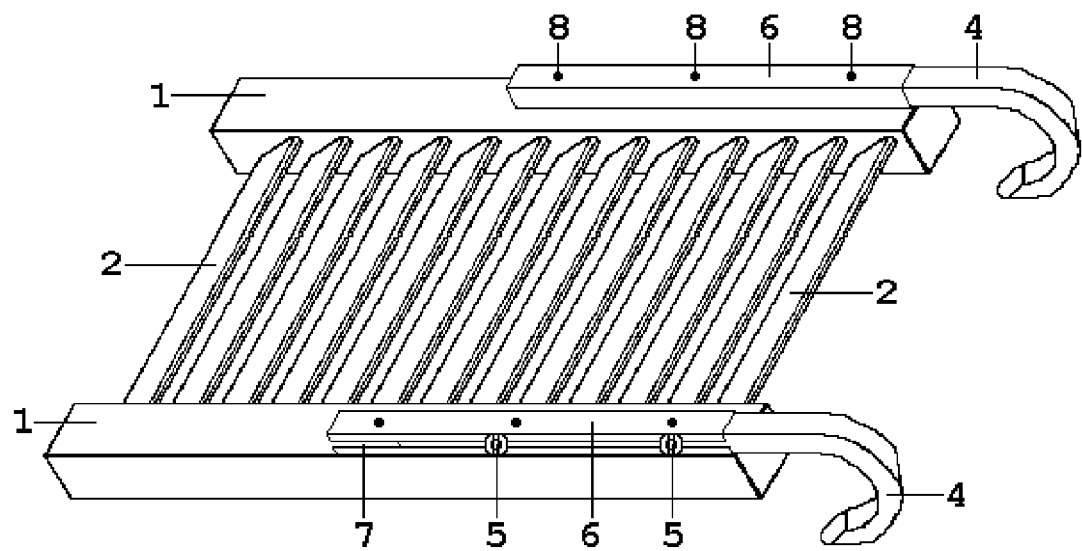
FIG. 3 is a perspective view of the first preferred embodiment of this invention, which uses and includes 2 adjustably sliding hooks to attach the invention to a litter box, thereby elevating one end of the louvered section, to form a louvered ramp.
Figure 4:
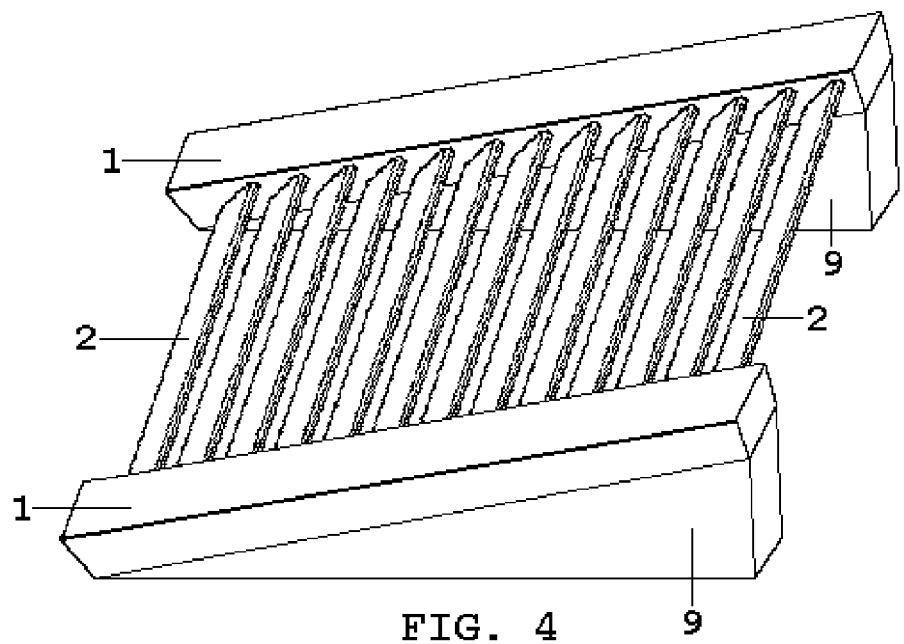
FIG. 4 is a perspective view of the second preferred embodiment of this invention, which uses and includes 2 right triangles to elevate one end of the louvered section, to form a free standing louvered ramp.

The first preferred embodiment of this invention is illustrated in FIG. 3. It uses and includes 2 adjustably sliding hooks to attach the invention to a litter box, thereby elevating one end of the louvered section, to form a louvered ramp. The second preferred embodiment of this invention is illustrated in FIG. 4. It uses and includes 2 right triangles to elevate one end of the louvered section, to form a free standing louvered ramp. Both of the preferred embodiments of this invention utilize a louvered section, which will be referred to as the louvered component of this invention.

Figure 1:
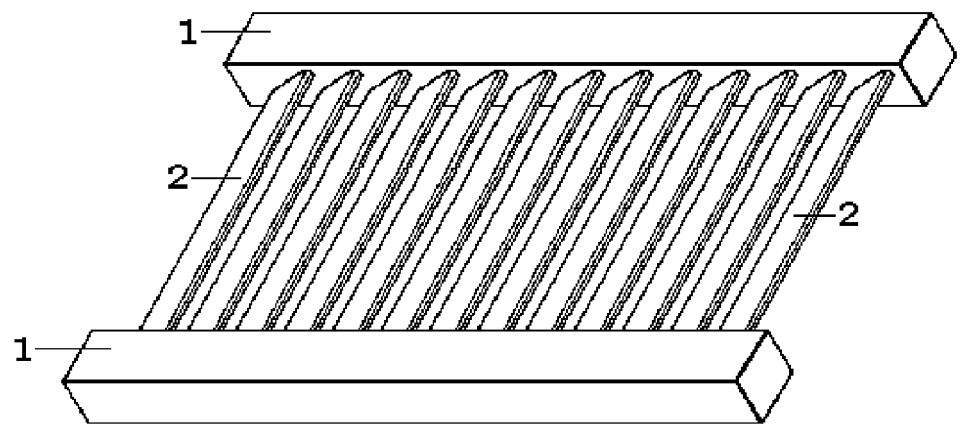
FIG. 1 is a perspective view of the louvered component of this invention.
Figure 2:
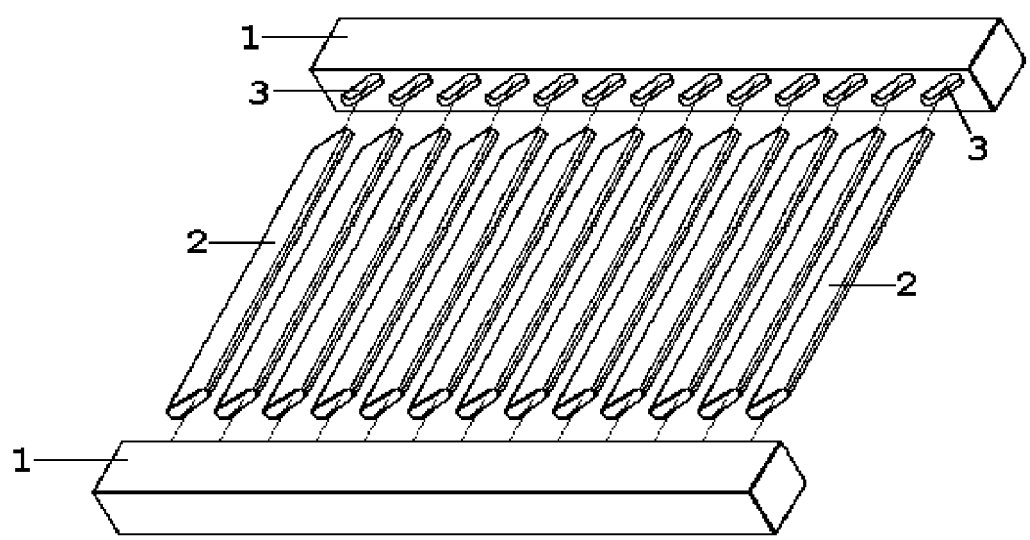
FIG. 2 is a perspective exploded view of the louvered component of this invention.

The louvered component of this invention, closely resembles a cut-out from the louvered section of a louvered door. See FIG. 1 for a perspective view of the louvered component of this invention. This louvered component could be molded from plastic in one piece, or could be constructed from sub-components out of plastic or wood, as illustrated by FIG. 2, which shows a perspective exploded view of the louvered component. The sub-components consist of 2 opposing parallel rectangular columns (1), and a plurality of parallel, equally spaced, and equally angled, louver boards (slats)(2) that extend perpendicular to, and between, the 2 opposing parallel rectangular columns (1). Both of the opposing parallel rectangular columns (1) are formed with a plurality of slanted recesses (3) on one side. Each of the plurality of louver boards (slats)(2) is glued and inserted at each end into corresponding slanted recesses (3) of the opposing parallel rectangular columns. Each of the louver boards (slats)(2) acts as a step in the louvered ramp, allowing a cat to ascend and descend the louvered ramp as though it were a stairway. The ridges of the louver boards (slats)(2) help to facilitate the removal of litter from the cat's paws as it descends the louvered ramp. The cracks between adjacent louver boards (slats)(2) allow litter to fall into a tray positioned beneath the louvered ramp.

The first preferred embodiment of this invention is illustrated in FIG. 3. It uses and includes 2 adjustably sliding hooks (4) to attach the invention to a litter box, thereby elevating one end of the louvered section, to form a louvered ramp. The hooks (4) are preferably molded out of plastic, although they could be molded out of metal. Preferably, the hooks (4) have a rectangular cross-section, so that the non-curved ends can be inserted in, and adjustably slide in, enclosing metal rectangular tubes (6) with a slightly larger rectangular cross-section. Each of the 2 rectangular tubes (6) has a slit (opening)(7) that runs down the entire length of one side. The slit (7) accommodates at least 2 thumb screws (5) to be screwed through the slit (7) and into the enclosed hook (4). Washers and/or spacers may be used with the thumb screws if needed. Tightening the thumb screws (5) secures the enclosed hook (4) so that it does not slide inside the enclosing rectangular tube (6). Loosening the thumb screws (5) allows the enclosed hook (4) to slide inside the enclosing rectangular tube (6), thus making the hook (4) adjustable. The 2 rectangular tubes (6) are secured to the louvered component (FIG. 1) with screws at the outside edges of the opposing parallel rectangular columns (1) at the ascended end of the louvered ramp. It is important to secure the rectangular tubes (6) and enclosed hooks (4) to the louvered component (FIG. 1) such that the louver boards (slats)(2) angle upward relative to the opposing parallel rectangular columns (1) in the direction of ascension up the louvered ramp. This invention will NOT work as intended if the rectangular tubes (6) and enclosed hooks (4) are secured to the louvered component (FIG. 1) such that the louver boards (slats)(2) angle downward relative to the opposing rectangular columns (1) in the direction of ascension up the louvered ramp. Obviously, holes (8) must be drilled through the rectangular tubes (6) and into the opposing parallel rectangular columns (1) of the louvered component (FIG. 1) in order to fasten the rectangular tubes (6) with screws. The top holes must be larger than the bottom holes in the rectangular tubes (6), in order to get the screw heads (and screwdriver end) inside of the rectangular tubes (6). Preferably, the screws are countersunk in the bottom holes, so that the screw heads don't interfere with the adjustably sliding hooks (4).

The second preferred embodiment of this invention is illustrated in FIG. 4. It uses and includes 2 right triangles (9) to elevate one end of the louvered section, to form a free standing louvered ramp. The right triangles (9) may be formed out of wood or molded plastic. The thickness of the right triangles should closely match the width of the opposing parallel rectangular columns (1) of the louvered component (FIG. 1) to which they are to be fastened to, preferably with screws. The hypotenuse length of the right triangles (9) should closely match the length of the louvered component (FIG. 1). It is important to secure the hypotenuses of the right triangles (9) to the opposing parallel rectangular columns (1) of the louvered component (FIG. 1) such that the louver boards (slats)(2) angle upward relative to the opposing rectangular columns (1) in the direction of ascension up the louvered ramp. This invention will NOT work as intended if the right triangles (9) are secured to the louvered component (FIG. 1) such that the louver boards (slats)(2) angle downward relative to the opposing rectangular columns (1) in the direction of ascension up the louvered ramp. Anti-slip pads may be affixed to the bottom of this second preferred embodiment for the purpose of preventing this louvered ramp invention from sliding away from the litter box.

This invention has been described in terms of preferred embodiments. This invention is not limited to the disclosed preferred embodiments, but also applies to embodiments that are modifications of the preferred embodiments, and embodiments in the spirit and scope of the broadest interpretation of this invention.

What is claimed is:

1. A louvered ramp invention for cleaning cat litter from a cat's paws, that ascends to, and descends from, a cat litter box access point; the louvered component of this invention, closely resembling a cut-out from the louvered section of a louvered door, consisting of 2 opposing parallel rectangular columns, and a plurality of parallel, equally spaced, and equally angled, louver boards/slats that extend perpendicular to, and between, the 2 opposing parallel rectangular columns, with the louver boards/slats angling upward relative to the opposing parallel rectangular columns in the direction of ascension up the louvered ramp; the ridges of the louver boards/slats facilitating the removal of litter from the cat's paws as it descends the louvered ramp, allowing the dislodged litter to fall through the cracks between the louver boards/slats, into a collection tray situated underneath this invention.

2. A louvered ramp invention, as in claim 1, that attaches to a litter box, for the purpose of securing this invention to the litter box, as well as elevating the ascended end of the louvered component.

3. A louvered ramp invention, as in claim 2, that attaches to a litter box with 2 adjustably sliding hooks; the adjustably sliding hooks being secured to the louvered component at the outside edges of the opposing parallel rectangular columns at the ascended end of the louvered ramp.

4. A louvered ramp invention, as in claim 1, that does not require attachment to a litter box, but is free standing, and is situated with the ascended end of the louvered component positioned against, or in close proximity to, a litter box access point.

5. A louvered ramp invention, as in claim 4, the ascended end of the louvered component being elevated by 2 right triangles, each right triangle being fastened to the opposing parallel rectangular columns of the louvered component.

* * * * *